United States Patent
Bayerle et al.

[19]

[11] Patent Number: 6,044,826
[45] Date of Patent: *Apr. 4, 2000

[54] DIAGNOSTIC DEVICE FOR MONITORING AN EXHAUST GAS RECIRCULATION SYSTEM OF AN INTERNAL COMBUSTION ENGINE

[75] Inventors: Klaus Bayerle, Regensburg; Stefan Schneider, Wenzenbach; Hong Zhang, Regensburg; Maximilian Engl, Friedberg, all of Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/259,640

[22] Filed: Mar. 1, 1999

Related U.S. Application Data

[63] Continuation of application No. PCT/DE97/01803, Aug. 20, 1997.

[30] Foreign Application Priority Data

Aug. 29, 1996 [DE] Germany .............. 196 34 975

[51] Int. Cl.⁷ .................. G01M 15/00; F02M 25/07; F02B 47/08
[52] U.S. Cl. .................... 123/568.16; 73/117.3
[58] Field of Search ............. 123/568.16; 73/117.3

[56] References Cited

U.S. PATENT DOCUMENTS

| 5,154,156 | 10/1992 | Ohuchi | 123/571 |
| 5,349,936 | 9/1994 | Uchinami | 123/676 |
| 5,508,926 | 4/1996 | Wade | 701/29 |
| 5,542,400 | 8/1996 | Matsumoto et al. | |

FOREIGN PATENT DOCUMENTS

| 4216044A1 | 11/1993 | Germany . |
| 4326351A1 | 2/1994 | Germany . |
| 06264827 | 9/1994 | Japan . |

*Primary Examiner*—Tony M. Argenbright
*Assistant Examiner*—Arnold Castro
*Attorney, Agent, or Firm*—Herbert L. Lerner; Laurence A. Greenberg; Werner H. Stemer

[57] ABSTRACT

A diagnostic device for monitoring an exhaust gas recirculation system determines a diagnostic value of the exhaust gas recirculation system without influencing the operation of the internal combustion engine. The diagnostic value depends on the intake pipe pressure and an observer intake pipe pressure. The latter is determined by an observer from one or more further operating variables of the internal combustion engine. The diagnostic device determines that the exhaust gas recirculation system is defective when the diagnostic value lies outside a range of values that depend on at least one operating variable.

10 Claims, 4 Drawing Sheets

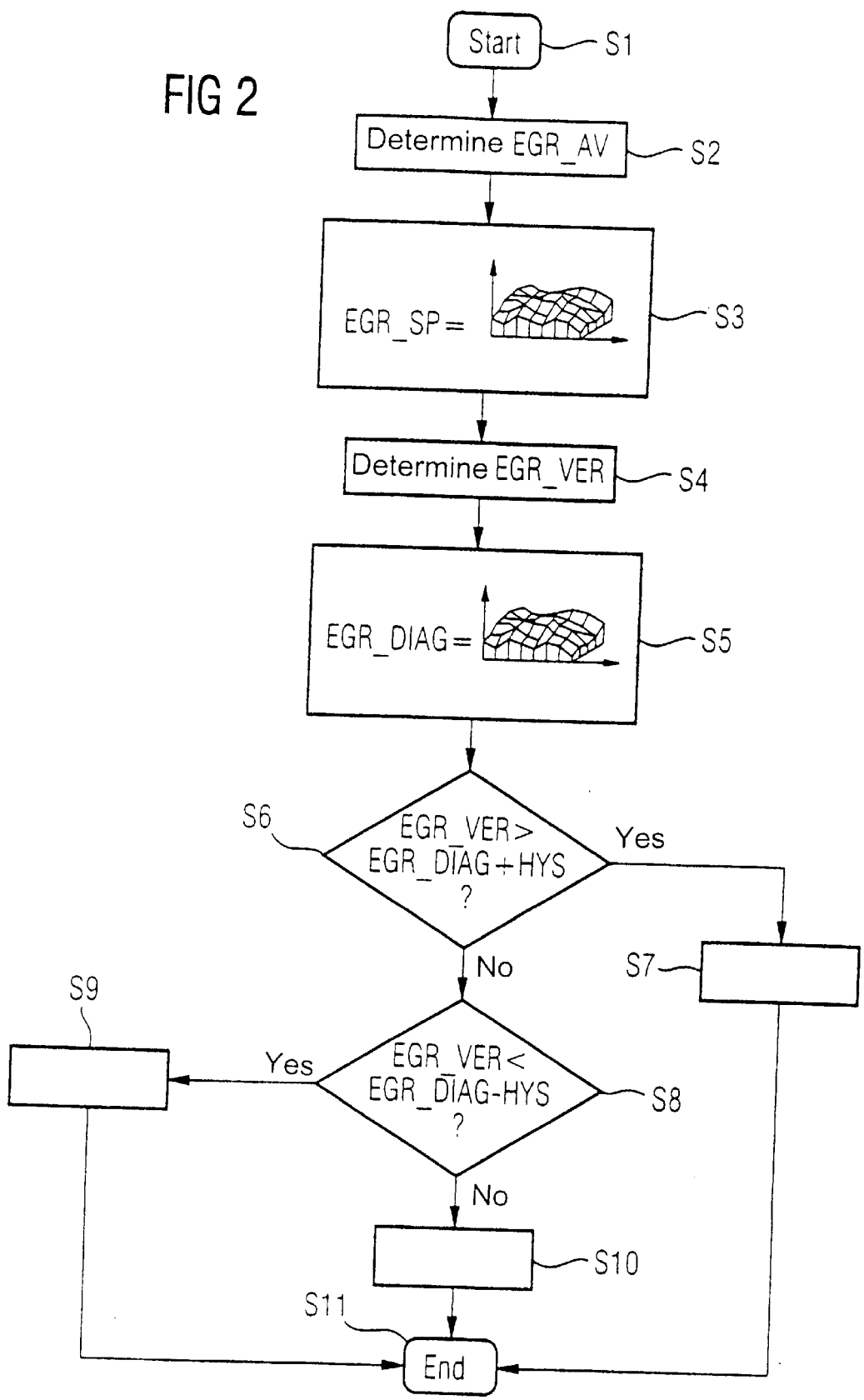

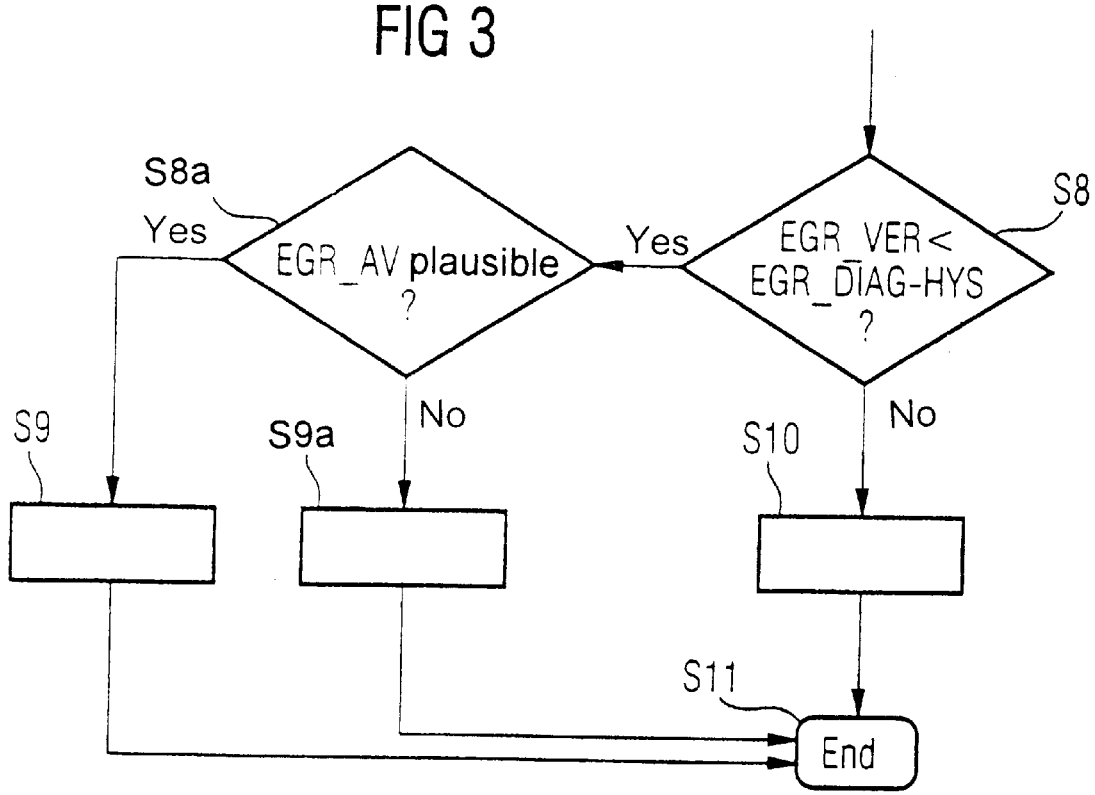

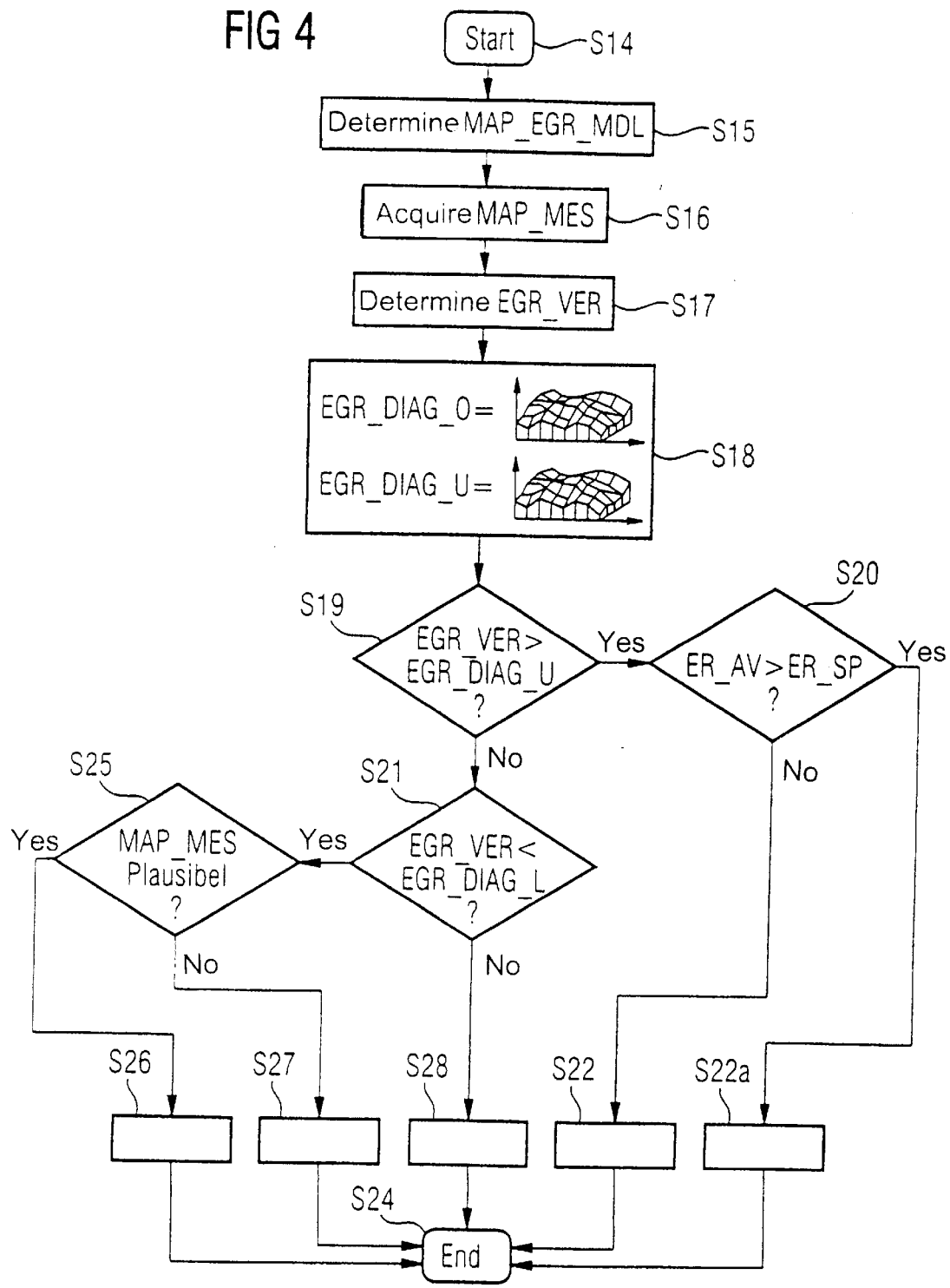

DIAGNOSTIC DEVICE FOR MONITORING AN EXHAUST GAS RECIRCULATION SYSTEM OF AN INTERNAL COMBUSTION ENGINE

CROSS-REFERENCE TO RELATED APPLICATION

This is a continuation of copending International Application PCT/DE97/01803, filed Aug. 20, 1997, which designated the United States.

BACKGROUND OF THE INVENTION

Field of the Invention

The invention lies in the automotive field. Specifically, the invention relates to a diagnostic device for monitoring an exhaust gas recirculation (EGR) system of an internal combustion engine. The system has an exhaust gas recirculation line which connects an exhaust gas tract to an intake tract. The opening cross section of the recirculation line is set by means of an exhaust gas recirculation valve, which is controlled by a control device. A pressure sensor disposed in the intake tract detects an intake pipe pressure.

Exhaust gas recirculation systems of internal combustion engines serve the purpose of reducing the $NO_x$ (nitrogen oxide) component in the exhaust gas. Since the exhaust gas of the internal combustion engine is an inert gas as to its essential constituents, it is possible by mixing exhaust gas with the intake combustion air to lower the peak combustion temperature and thus to reduce the emission of nitrogen oxides. The mass of the recirculated exhaust gas in the ratio to the sum of the mass of a fresh gas (intake air) and the mass of the recirculated exhaust gas is denoted below as the exhaust gas recirculation rate or EGR rate.

Given an exhaust gas recirculation rate of 10%, the nitrogen oxide emissions are already reduced by approximately 50%. The HC (hydrocarbon) and CO (carbon monoxide) emissions of the internal combustion engine cannot be significantly reduced by an exhaust gas recirculation system. The exhaust gas recirculation rate must be set as accurately as possible, since otherwise a rise in the HC and CO components in the exhaust gas results in the case of an excessively high exhaust gas recirculation rate.

Exhaust gas recirculation systems can, moreover, also be used to lower the fuel consumption. In the case of such exhaust gas recirculation systems, a significant reduction in the fuel consumption in the partial load operation of the internal combustion engine is achieved by means of a very high EGR rate (>20%), since the throttle losses and the wall heat losses in the combustion chamber of the internal combustion engine are reduced.

A prior art diagnostic device is known from German patent application DE 42 16 044 A1. There, an exhaust gas recirculation system of an internal combustion engine is monitored. The exhaust gas recirculation system comprises an exhaust gas recirculation line which connects an exhaust gas tract to an intake tract, and whose opening cross section can be influenced by means of an exhaust gas recirculation valve. A control device for controlling the exhaust gas recirculation valve is also provided. It is known from DE 42 16 044 to design the diagnostic device in such a way that the temperature of the recirculated exhaust gas is measured in the exhaust gas recirculation line for the purpose of monitoring the required exhaust gas recirculation rate. However, that monitoring operation is not reliably possible in the specific case of a high exhaust gas recirculation rate, since the gradients of the temperature rise are very flat and it is impossible to eliminate disturbances owing to the environmental conditions such as, for example, the engine compartment temperature.

It is also known from DE 42 16 044 A1 to detect the change in the intake pipe pressure upon opening or closing of the exhaust gas recirculation valve, and thus to detect whether exhaust gas is flowing properly through the exhaust gas recirculation duct when the exhaust gas recirculation valve is opened. For that purpose, the exhaust gas recirculation valve is closed and subsequently opened in a prescribed operating state of the internal combustion engine such as, for example, in overrun conditions. Active intervention in the control of the exhaust gas recirculation valve is therefore necessary, and this leads to problems with emissions and the drivability of the motor vehicle.

The prior art diagnostic device is designed in such a way that it carries out a detection of engine cutout in prescribed operating states of the internal combustion engine. However, there is again in this case also an active intervention in the exhaust gas recirculation control.

SUMMARY OF THE INVENTION

It is accordingly an object of the invention to provide a diagnostic device for monitoring an exhaust gas recirculation system of an internal combustion engine, which overcomes the above-mentioned disadvantages of the heretofore-known devices and methods of this general type and which is, moreover, simple and reliable.

With the foregoing and other objects in view there is provided, in accordance with the invention, a diagnostic device for monitoring an exhaust gas recirculation system of an internal combustion engine, comprising: an exhaust gas recirculation line fluidically connected between an exhaust gas tract and an intake tract of an internal combustion engine;

an exhaust gas recirculation valve in the exhaust gas recirculation line for setting an opening cross section thereof;

a control device connected to and controlling the exhaust gas recirculation valve;

a pressure sensor disposed in the intake tract for detecting an intake pipe pressure;

an observer determining an observer intake pipe pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake pipe pressure and the observer intake pipe pressure; and means for determining that the exhaust gas recirculation system is defective when the diagnostic value lies outside a given range of values dependent on at least one operating variable.

In accordance with an added feature of the invention, the diagnostic value is determined by the determining means by forming a ratio of the actual value to a setpoint value of an exhaust gas recirculation rate.

In accordance with an additional feature of the invention, the setpoint value is determined from a characteristic diagram in dependence on a load variable.

In accordance with another feature of the invention, the actual value EGR_AV is determined in accordance with the relationship:

$$EGR\_AV = \frac{MAP\_MES - MAP\_MDL}{MAP\_MES}$$

where MAP_MDL is the observer intake pipe pressure, and MAP_MES is the intake pipe pressure, and wherein the observer forms as part of the control device, the observer comprising a physical model of the intake tract and determining the observer intake pipe pressure as a function of a throttle blade opening angle and a speed of the internal combustion engine.

In an alternative embodiment, the diagnostic apparatus is programmed to determine the diagnostic value by forming a difference between an actual value and a setpoint value of an exhaust gas recirculation rate.

In accordance with a further feature of the invention, the diagnostic value is determined by forming the ratio of the intake pipe pressure to the observer intake pipe pressure, the observer again forming a part of the control device and comprising a physical model of the intake tract and of the exhaust gas recirculation system, the observer determining the observer intake pipe pressure as a function of an opening angle of a throttle blade, a degree of opening of the exhaust gas recirculation valve, and a speed of the internal combustion engine.

In accordance with again an added feature of the invention, the given range of values is prescribed by a diagnostic threshold value and a hysteresis value and wherein the diagnostic threshold value is determined from a characteristic diagram in dependence on at least one operating variable of the internal combustion engine.

In accordance with again another feature of the invention, the determining means determine an excessively high mass flow to exist in the exhaust gas recirculation line when the diagnostic value lies above the given range of values and a noisy running threshold value is exceeded.

In accordance with again a further feature of the invention, when the diagnostic value lies below the given range of values, a plausibility test of the actual value is carried out, and it is determined that an excessively low mass flow exists in the exhaust gas recirculation line if the actual value is plausible.

In accordance with a concomitant feature of the invention, the exhaust gas recirculation valve is closed during the plausibility test.

Other features which are considered as characteristic for the invention are set forth in the appended claims.

Although the invention is illustrated and described herein as embodied in a diagnostic device for monitoring an exhaust gas recirculation system of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flowchart of a program by means of which a first embodiment of the diagnostic device monitors the exhaust gas recirculation system;

FIG. 3 is a flowchart of a program by means of which a second embodiment of the diagnostic device monitors the exhaust gas recirculation system; and FIG. 4 is a flowchart of a program by means of which a third embodiment of the diagnostic device monitors the exhaust gas recirculation system.

DESCRIPTION OF THE PREFERRED EMBODIMENTS

Figure 1:
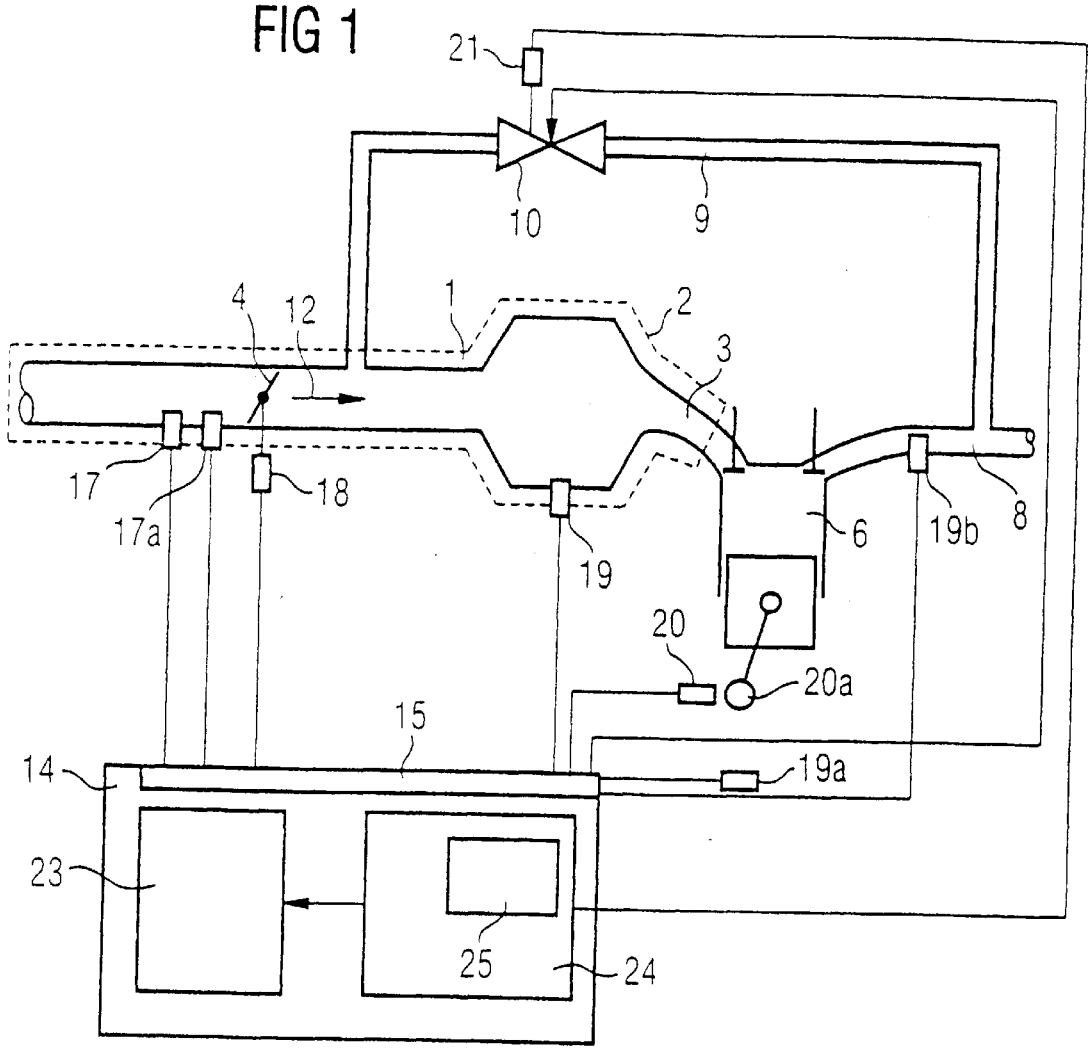
FIG. 1 is a diagrammatic view of an internal combustion engine with the diagnostic device according to the invention.

Referring now to the figures of the drawing in detail and first, particularly, to FIG. 1 thereof, there are illustrated those part of an internal combustion engine which are necessary for an understanding of the invention.

An intake tract 1 has a collector 2 and an intake pipe 3. A throttle blade 4 is disposed in the intake tract 1. The intake pipe 3 connects the collector 2 to an inlet of a cylinder 6. The cylinder 6 is connected to an exhaust gas tract 8 through which the exhaust gases are exhausted. An exhaust gas recirculation line 9 or EGR line 9 branches off from the exhaust gas tract 8 and opens in the direction of flow of the intake air (denoted by the arrow 12) into the intake tract 1. An exhaust gas recirculation valve 10 which comprises an electromagnetic actuator is arranged in the exhaust gas recirculation line 9.

An electronic engine management system 14 comprises a preprocessing unit 15 which conditions signals from sensors that detect various operating variables of the internal combustion engine. A temperature sensor 17 which detects the temperature of the intake air is provided in the exemplary embodiment represented here. An angle sensor 18 detects the opening angle of the throttle blade 4, a pressure sensor 19 detects an intake pipe pressure MAP_MES, a crankshaft angle sensor 20 detects the current crankshaft angle in each case, and a sensor 21 for the degree of opening detects a degree of opening of the exhaust gas recirculation valve 10. Moreover, in a convenient embodiment of the invention at least one of the following sensors is also provided: an air mass flowmeter 17a, which detects an air mass flow; an engine temperature sensor 19a which detects the engine temperature of the internal combustion engine, and an exhaust gas temperature sensor 19b which detects the exhaust gas temperature in the exhaust gas tract 8. The sensor signals can also alternatively be transmitted via a bus (CAN bus).

The electronic engine management system 14 has, moreover, a diagnostic device 23 according to the-invention, which monitors the exhaust gas recirculation system. The electronic engine management system 14 also has a control device 24 which is connected in an electrically conducting fashion to the actuator of the exhaust gas recirculation valve 10. It controls the actuator of the exhaust gas recirculation valve 10 in such a way that the degree of opening of the exhaust gas recirculation valve 10 is set as a function of at least one operating variable of the internal combustion engine—for example the opening angle of the throttle blade 4 and a speed n of the crankshaft 20a. It is also possible to provide an electropneumatic transducer as an alternative to the electromagnetic actuator of the exhaust gas recirculation valve 10. The control device 24 determines in a known way a fuel mass which is injected per operating cycle of the cylinder 6.

The control device 24 has an observer 25 which includes a physical model of the intake tract 1. Operating variables which are not detected directly by sensors can also be determined with this model in nonstationary operation of the internal combustion engine. In this exemplary embodiment of the invention, the observer determines an observer intake pipe pressure MAP_MDL as a function of the opening angle of the throttle blade and the speed n. The observer preferably also has available to it the environmental pressure and/or the exhaust gas temperature and/or the temperature in the intake tract and/or a controlled variable, which determines the stroke characteristic of the gas exchange valves of the internal combustion engine, for determining the observer intake pipe pressure MAP_MDL. The model is based, for example, on differential equations which can be derived from the equation of state for ideal gases and the equation of flow for ideal gases. Such a model is described in a commonly assigned specification, published at WO 96/32579 (herewith incorporated by reference).

In another advantageous embodiment of the invention, the observer has a physical model of the intake tract 1 and of the exhaust gas recirculation system, and determines the observer intake pipe pressure MAP_EGR_MDL, which is a model parameter for the exhaust gas partial pressure in the intake tract, as a function of the opening angle of the throttle blade, the degree of opening of the exhaust gas recirculation valve 10 and the speed n. Preferably, the observer also has available to it for determining the observer intake pipe pressure MAP_EGR_MDL the environmental pressure, and/or the exhaust gas temperature, and/or the temperature in the intake tract, and a controlled variable which determines the stroke characteristic of the gas exchange valves of the internal combustion engine. Such a model is described in a commonly assigned copending application No. 09/153,506, which is herewith incorporated by reference. It goes without saying that in addition to those operating variables it is also possible to use further operating variables to determine the observer intake pipe pressure MAP_MDL, MAP_EGR_MDL.

Referring now to FIG. 2, there is shown a flowchart of the program by means of which a first embodiment of the diagnostic device monitors the exhaust gas recirculation system. The program start is indicated at step S1.

A desired value or setpoint value EGR_AV of the exhaust gas recirculation rate is determined in a step S2. The pressure sensor 19 detects the intake pipe pressure MAP_MES and the observer 25 determines the observer intake pipe pressure MAP_MDL. In this exemplary embodiment, the observer comprises only a model of the intake tract 1 of the internal combustion engine. The exhaust gas partial pressure, which is proportional to an exhaust gas mass flow at the exhaust gas recirculation valve 10, is thus not detected by this model. Thus, the actual value EGR_AV is advantageously determined in accordance with the following formula:

$$EGR\_AV = \frac{MAP\_MES - MAP\_MDL}{MAP\_MES} \quad (F1)$$

A setpoint value EGR_SP of the exhaust gas recirculation rate is read out in a step S3 from a permanently stored characteristic diagram KF1. Setpoint values are stored in the characteristic diagram KF1 as a function of a load variable (for example an air mass flow at the throttle blade 4) and the speed n and/or an engine temperature and/or a controlled variable which determines the stroke characteristic of the gas exchange valves of the internal combustion engine.

A diagnostic value EGR_VER, EGR_DIF of the exhaust gas recirculation system is determined in a step S4. Thus, the diagnostic value EGR_VER is assigned the ratio of the actual value EGR_AV and the setpoint value EGR_SP. Alternatively, it is also possible for the diagnostic value EGR_DIF to be assigned a difference between the actual value EGR_AV and the setpoint value EGR_SP.

A diagnostic threshold value EGR_DIAG is read out from a second characteristic diagram KF2 in a step S5, and interpolated if appropriate. Diagnostic threshold values EGR_DIAG are permanently stored in the characteristic diagram KF2 as a function of at least one operating variable of the internal combustion engine. It is advantageous when the diagnostic threshold values are stored in the characteristic diagram KF2 as a function of a load variable—for example, the air mass flow at the throttle blade 4, or the opening angle of the throttle blade 4 and the speed n—and/or the environmental pressure and/or the exhaust gas temperature and/or the temperature in the intake tract 1 and/or a controlled variable determining the stroke characteristic of the gas exchange valves of the internal combustion engine.

A test is carried out in a step S6 as to whether the diagnostic value of the exhaust gas recirculation system EGR_VER, EGR_DIF is greater than the diagnostic threshold value EGR_DIAG plus a hysteresis value HYS. The hysteresis value HYS is either permanently prescribed or dependent on at least one operating variable of the internal combustion engine. If the condition tested in the step S6 is fulfilled, a branch is made into the step S7. There, the diagnostic device 23 detects that the flow through the EGR recirculation line 9 is too high. The program is subsequently terminated in the step S11.

If the condition tested in the step S6 is not fulfilled, a branch is made into the step S8 by checking whether the diagnostic value EGR_VER, EGR_DIF is smaller than the diagnostic threshold value EGR_DIAG minus the hysteresis value HYS. If this is the case, a branch is made into the step S9 in which the diagnostic device 23 detects the flow through the exhaust gas recirculation line 9 as being too low. The process is then terminated in the step S11.

If the condition tested in step S8 is not fulfilled, a branch is made into the step S10 in which it is detected that the exhaust gas recirculation system is functioning satisfactorily. The program is subsequently terminated in the step S10.

A check is therefore made in the steps S6 and S8 as to whether the diagnostic value EGR_VER lies outside a range of values whose lower limit is the diagnostic threshold value EGR_DIAG minus the hysteresis value, and whose upper limit is the diagnostic threshold value EGR_DIAG plus the hysteresis value. It is advantageous when the hysteresis value HYS is also determined as a function of at least one operating variable.

A program in accordance with the flowchart is preferably started cyclically at prescribed time intervals during the operation of the internal combustion engine.

A flowchart of the program by means of which a second embodiment of the diagnostic device 23 monitors the exhaust gas recirculation system is shown in FIG. 3. In a departure from FIG. 2, a branch is made into a step S8a when it has been determined in the step S8 that the diagnostic value EGR_VER, EGR_DIF is smaller than the diagnostic threshold value EGR_DIAG minus the hysteresis value HYS. A check is made in the step S8a as to whether the actual value EGR_AV of the exhaust gas recirculation rate is plausible. For this purpose, the actuator of the exhaust gas recirculation valve 10 is driven by the control device 24 in such a way that the exhaust gas recirculation valve 10 closes.

With a closed exhaust gas recirculation valve 10, a check is then made as to whether the diagnostic value EGR_VER lies within a second range of values, whose upper limit is prescribed by the sum of a second diagnostic threshold value and the hysteresis value HYS and whose lower limit is described by the difference between a second diagnostic threshold value and the hysteresis value HYS.

If this is the case, plausibility is detected and a branch is made into the step S9, in which, in a similar way as in FIG. 2, an excessively low flow through the exhaust gas recirculation line 9 is determined.

If the actual value EGR_AV in step S8 is not plausible, a branch is made into the step S9a. No diagnosis is possible in this step, since a defect is present in the electronic engine management system 14 or in one of the sensors. If appropriate, a further function is invoked here for detecting this error. The program is subsequently terminated in the step S11.

A flowchart of the program by means of which a third embodiment of the diagnostic device 23 monitors the exhaust gas recirculation system is shown in FIG. 4. The program is started in a step S14.

An observer intake pipe pressure MAP_EGR_MDL is determined in a step S15. The observer intake pipe pressure MAP_EGR_MDL is determined in the observer 25 with the aid of a physical model of the intake tract 1 and of the exhaust gas recirculation system—as has been described further above.

The intake pipe pressure MAP_MES is detected by the pressure sensor 19 in a step S16. The diagnostic value EGR_VER, which here is assigned the ratio of the intake pipe pressure MAP_MES and the observer intake pipe pressure MAP_EGR_MDL is determined in a step S17.

In the step S18, an upper diagnostic threshold value EGR_DIAG_U is determined from a third characteristic diagram KF3, which depends on at least one operating variable of the internal combustion engine, preferably on an air mass flow which is detected by the air mass flowmeter 17a, and depends on the speed n and/or on the engine temperature and/or a controlled variable determining the stroke characteristic of the gas exchange valves of the internal combustion engine. Moreover, in the step 18 a lower diagnostic threshold value EGR_DIAG_U is determined from a characteristic diagram KF4 which depends on the air mass flow, the speed n and/or an engine temperature and/or a controlled variable determining the stroke characteristic of the gas exchange valves of the internal combustion engine.

A check is made in the step S19 as to whether the diagnostic value EGR_VER is greater than the upper diagnostic threshold value EGR_DIAG_U. If this is the case, a branch is made into the step S20 in which a noisy running actual value ER_AV and a noisy running setpoint value ER_SP are determined. A method for determining the noisy running actual and setpoint values ER_AV, ER_SP is described in a commonly assigned, published international application WO 97/22786 (herewith incorporated by reference).

Subsequently, it is checked in the step S20 whether the noisy running actual value ER_AV is greater than the noisy running setpoint value ER_SP. If this is the case, a branch is made into the step S22a in which the diagnostic device 23 detects that the flow through the exhaust gas recirculation line 9 is too high. The program is subsequently terminated in the step S24.

If the condition of step S20 is not fulfilled, a branch is made into the step S22 in which the diagnostic device 23 detects that the exhaust gas recirculation system is free from defects. The program is then terminated in the step S24.

If the diagnostic value EGR_VER is not greater in the step S19 than the upper diagnostic threshold value EGR_DIAG_U, a branch is made into the step S21 in which it is checked whether the diagnostic value EGR_VER is smaller than the lower diagnostic threshold value EGR_DIAG_L.

If this is the case, a branch is made into the step S25 in which it is checked whether the intake pipe pressure MAP_MES is plausible. For this purpose, the exhaust gas recirculation valve is closed and it is checked in accordance with the steps S15 to S21 whether the diagnostic value EGR_VER lies within the range of values whose lower limit is the lower diagnostic threshold value EGR_DIAG_L and whose upper limit is the upper diagnostic threshold value EGR_DIAG_U. If this is the case, the intake pipe pressure MAP_MES is plausible, and a branch is made into the step S26 in which the diagnostic device 23 detects an excessively low flow through the exhaust gas recirculation line 9.

If this is not the case, a branch is made into the step S27, which corresponds to the step S9a. The program is terminated both after step S26 and after step S27 in the step S24.

In a further embodiment of the invention, the diagnostic value EGR_VER, EGR_DIF is averaged, and the further calculation is based on an average diagnostic value MW_EGR_VER, MW_EGR_DIF. The averaging is performed in accordance with one of the following computational rules:

a) $MW\_EGR\_VER = MW\_EGR\_VER_{old} +$
$$(EGR\_VER - MW\_EGR\_VER_{old})\frac{1}{k}$$

b) $MW\_EGR\_VER = \frac{1}{i}\sum_{j=1}^{i} EGR\_VER_j$ c) $MW\_EGR\_VER = \sqrt[i]{EGR\_VER_1 EGR\_VER_2 \ldots EGR\_VER_i}$ where i number of measurements, k=weighting factor.

The embodiment of the diagnostic device 23 which is described in FIG. 4 has the advantage that the diagnosis proceeds in several stages, and that therefore extremely precise results are determined. Moreover, the operation of the internal combustion engine is not influenced when the exhaust gas recirculation system is functioning acceptably.

We claim:

1. A diagnostic device for monitoring an exhaust gas recirculation system of an internal combustion engine, comprising:

an exhaust gas recirculation line fluidically connected between an exhaust gas tract and an intake tract of an internal combustion engine;

an exhaust gas recirculation valve in said exhaust gas recirculation line for setting an opening cross section thereof;

a control device connected to and controlling said exhaust gas recirculation valve;

a pressure sensor disposed in the intake tract for detecting an intake pipe pressure;

an observer determining an observer intake pipe pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake pipe pressure and the observer intake pipe pressure and said diagnostic apparatus is programmed to determine the diagnostic value by forming a ratio of the actual value to a setpoint value of an exhaust gas recirculation rate; and means for determining that the exhaust gas recirculation system is defective when the diagnostic value lies outside a given range of values dependent on at least one operating variable.

2. The diagnostic device according to claim 1, wherein the setpoint value is determined from a characteristic diagram in dependence on a load variable.

3. The diagnostic device according to claim 1, wherein the actual value is determined in accordance with the relationship:

$$EGR\_AV = \frac{MAP\_MES - MAP\_MDL}{MAP\_MES}$$

where EGR_AV is the actual value, MAP_MDL is the observer intake pipe pressure, and MAP_MES is the intake pipe pressure, and wherein said observer forms as part of said control device, said observer comprising a physical model of the intake tract and determining the observer intake pipe pressure as a function of a throttle blade opening angle and a speed of the internal combustion engine.

4. A diagnostic device for monitoring an exhaust gas recirculation system of an internal combustion engine, comprising:

an exhaust gas recirculation line fluidically connected between an exhaust gas tract and an intake tract of an internal combustion engine;

an exhaust gas recirculation valve in said exhaust gas recirculation line for setting an opening cross section thereof;

a control device connected to and controlling said exhaust gas recirculation valve;

a pressure sensor disposed in the intake tract for detecting an intake pipe pressure;

an observer determining an observer intake pipe pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake pipe pressure and the observer intake pipe pressure and said diagnostic apparatus is programmed to determine the diagnostic value by forming a difference between an actual value and a setpoint value of an exhaust gas recirculation rate; and means for determining that the exhaust gas recirculation system is defective when the diagnostic value lies outside a given range of values dependent on at least one operating variable.

5. The diagnostic device according to claim 4, wherein the setpoint value is determined from a characteristic diagram in dependence on a load variable.

6. A diagnostic device for monitoring an exhaust gas recirculation system of an internal combustion engine, comprising:

an exhaust gas recirculation line fluidically connected between an exhaust gas tract and an intake tract of an internal combustion engine;

an exhaust gas recirculation valve in said exhaust gas recirculation line for setting an opening cross section thereof;

a control device connected to and controlling said exhaust gas recirculation valve;

a pressure sensor disposed in the intake tract for detecting an intake pipe pressure;

an observer determining an observer intake pipe pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake pipe pressure and the observer intake pipe pressure and the diagnostic value is determined by forming a ratio of the intake pipe pressure to the observer intake pipe pressure, and wherein said observer forms a part of said control device and comprises a physical model of the intake tract and of the exhaust gas recirculation system, said observer determining the observer intake pipe pressure as a function of an opening angle of a throttle blade, a degree of opening of said exhaust gas recirculation valve, and a speed of the internal combustion engine; and means for determining that the exhaust gas recirculation system is defective when the diagnostic value lies outside a given range of values dependent on at least one operating variable.

7. A diagnostic device for monitoring an exhaust gas recirculation system of an internal combustion engine, comprising:

an exhaust gas recirculation line fluidically connected between an exhaust gas tract and an intake tract of an internal combustion engine;

an exhaust gas recirculation valve in said exhaust gas recirculation line for setting an opening cross section thereof;

a control device connected to and controlling said exhaust gas recirculation valve;

a pressure sensor disposed in the intake tract for detecting an intake pipe pressure;

an observer determining an observer intake pipe pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake pipe pressure and the observer intake pipe pressure; and means for determining that the exhaust gas recirculation system is defective when the diagnostic value lies outside a given range of values dependent on at least one operating variable and prescribed by a diagnostic threshold value and a hysteresis value and wherein the diagnostic threshold value is determined from a characteristic diagram in dependence on at least one operating variable of the internal combustion engine.

8. A diagnostic device for monitoring an exhaust gas recirculation system of an internal combustion engine, comprising:

an exhaust gas recirculation line fluidically connected between an exhaust gas tract and an intake tract of an internal combustion engine;

an exhaust gas recirculation valve in said exhaust gas recirculation line for setting an opening cross section thereof;

a control device connected to and controlling said exhaust gas recirculation valve;

a pressure sensor disposed in the intake tract for detecting an intake pipe pressure, an observer determining an observer intake Dive pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake vine pressure and the observer intake pipe pressure; and means for determining that the exhaust gas recirculation system is defective when the diagnostic value lies outside a given range of values dependent on at least one operating variable, said determining means determining an excessively high mass flow to exist in said exhaust gas recirculation line when the diagnostic value lies above the given range of values and a noisy running threshold value is exceeded.

9. A diagnostic device for monitoring an exhaust gas recirculation system of an internal combustion engine comprising:

an exhaust gas recirculation line fluidically connected between an exhaust gas tract and an intake tract of an internal combustion engine;

an exhaust gas recirculation valve in said exhaust gas recirculation line for setting an opening cross section thereof;

a control device connected to and controlling said exhaust gas recirculation valve;

a pressure sensor disposed in the intake tract for detecting an intake pipe pressure;

an observer determining an observer intake pipe pressure from at least one operating variable of the internal combustion engine other than the intake pipe pressure;

a diagnostic apparatus for determining a diagnostic value of the exhaust gas recirculation system without influencing an operation of the internal combustion engine, wherein the diagnostic value depends on the intake pipe pressure and the observer intake pipe pressure; and means for determining that the exhaust gas recirculation system is defective when the diagnostic value lies outside a given range of values dependent on at least one operating variable, wherein said determining means is programmed, when the diagnostic value lies below the given range of values, to carry out a plausibility test of the actual value, and to determine an excessively low mass flow to exist in said exhaust gas recirculation line if the actual value is plausible.

10. The diagnostic device according to claim 9, wherein said exhaust gas recirculation valve is closed during the plausibility test.

* * * * *